United States Patent
Laird

(10) Patent No.: US 9,903,716 B1
(45) Date of Patent: Feb. 27, 2018

(54) CONSTRUCTION SITE OFFSET ADAPTER ASSEMBLY

(71) Applicant: Gregory Eugene Laird, Kingsburg, CA (US)

(72) Inventor: Gregory Eugene Laird, Kingsburg, CA (US)

( * ) Notice: Subject to any disclaimer, the term of this patent is extended or adjusted under 35 U.S.C. 154(b) by 169 days.

(21) Appl. No.: 14/971,874

(22) Filed: Dec. 16, 2015

Related U.S. Application Data

(60) Provisional application No. 62/094,993, filed on Dec. 20, 2014.

(51) Int. Cl.
*G01C 15/00* (2006.01)
*G01C 9/02* (2006.01)

(52) U.S. Cl.
CPC .............. *G01C 15/00* (2013.01); *G01C 9/02* (2013.01)

(58) Field of Classification Search
CPC .. G01C 9/02; G01C 9/28; G01C 15/00; E01C 23/00; E01C 23/01
USPC ......... 33/1 H, 347, 354, 370, 371, 372, 373; 248/314
See application file for complete search history.

(56) References Cited

U.S. PATENT DOCUMENTS

| | | | | |
|---|---|---|---|---|
| 1,308,630 A | * | 7/1919 | Hatch | F16M 11/24 16/29 |
| 2,647,712 A | * | 8/1953 | Sandmoen | B25H 3/00 248/314 |
| 2,981,000 A | * | 4/1961 | Long | G01C 15/06 33/1 H |
| 3,890,717 A | * | 6/1975 | Haun | G01C 15/00 33/1 LE |
| 3,911,589 A | * | 10/1975 | Myeress | F16M 11/24 248/127 |
| 4,066,232 A | * | 1/1978 | Hermeyer | G01C 9/28 248/231.51 |
| 4,231,156 A | * | 11/1980 | Cooper | E01C 19/008 24/490 |
| 4,932,134 A | * | 6/1990 | Meadows | E04G 21/1833 33/1 H |
| 6,834,839 B1 | * | 12/2004 | Wilson | F16M 13/02 248/230.1 |
| 7,530,174 B1 | * | 5/2009 | Kimball et al. | G01C 9/26 33/354 |

(Continued)

FOREIGN PATENT DOCUMENTS

| | | | | |
|---|---|---|---|---|
| CN | 205664818 U | * | 10/2016 | ............... G01C 9/02 |
| DE | 9301411 U1 | * | 7/1993 | ............... G01C 9/02 |
| JP | 2005257599 A | * | 9/2005 | ............. G01C 15/00 |

*Primary Examiner* — R. A. Smith

(57) ABSTRACT

A construction site offset adapter assembly includes a main body and an end cap. The main body includes a securing device and a measurement pointer. The securing device couples the main body to a level and a measurement device. The measurement pointer is aligned with the lower edge of the level when the main body is coupled to the level. The end cap includes a second securing device and an offset measurement point. The second securing device couples the end cap to the level, and to an offset rod. The offset measurement point is aligned with the lower edge of the level when the end cap is coupled to the level. The construction site offset adapter assembly may include a plurality of securing devices and/or a plurality of second securing devices. The main body may include a plurality of measurement pointers.

7 Claims, 12 Drawing Sheets

(56) References Cited

U.S. PATENT DOCUMENTS

2002/0083606 A1* 7/2002 Monteil et al. ......... E01C 23/01
33/521

* cited by examiner

CONSTRUCTION SITE OFFSET ADAPTER ASSEMBLY

This application claims the benefit of U.S. Provisional Application No. 62/094,993 filed Dec. 20, 2014 to Laird.

FIELD OF THE INVENTION

Embodiments hereof relate to offset elevation measurements and methods for transferring offset elevation measurements at a construction site. More particularly, the present invention relates to a construction site offset adapter assembly providing increased accuracy and reduced labor requirements when transferring offset elevation measurements at a construction site.

BACKGROUND OF THE INVENTION

The current method of surveying a construction site is to place survey hubs (pins or wood stakes with a nail positioned in it) in the ground with an offset (typically 3' to 5' offset from actual placement) to mark curbs, asphalt, lights, backflow devices, fire hydrants, vaults, and numerous other fixtures. The survey hubs have elevations listed on them as to where each fixture is to be placed and at what elevation. It is difficult to transfer the elevation without the assistance of a laser or the assistance of two personnel working together. Use of a laser requires possession of the equipment and completing a setup at, or near the location. With the two-person method, one person will hold a tape measure perpendicular to a level to measure elevation and the other person levels the level and places a mark on the ground at the actual fixture placement point. While a single person can attempt the two-person method, the operation is awkward and the results are often inaccurate. Accordingly, a device is needed that provides an easy, accurate, one-man method of transferring an offset elevation from a survey hub to the location of a fixture is needed, increasing productivity and accuracy, and reducing labor requirements.

BRIEF SUMMARY OF THE INVENTION

Embodiments hereof are related to a construction site offset adapter assembly. The construction site offset adapter assembly includes a main body and an end cap. The main body includes a securing device and a measurement pointer. The securing device couples the main body to a level and to a measuring device. The measurement pointer is aligned with a lower edge of the level when the level is coupled therein. The end cap includes a second securing device and an offset measurement point. The second securing device couples the end cap to the level and to an offset rod. The offset measurement point is aligned with the lower edge of the level when the level is coupled therein.

Embodiments hereof are related to a construction site offset adapter assembly. The construction site offset adapter assembly includes a body, a securing device, a measurement pointer, and an offset measurement point. The securing device couples the main body to a level, to a measuring device, and to an offset rod. The measurement pointer is aligned with a lower edge of the level when the level is coupled therein. The offset measurement point is aligned with the lower edge of the level when the level is coupled therein.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

This application claims the benefit of U.S. Provisional Application No. 62/094,993 filed Dec. 20, 2014 to Laird.

The current method of transferring offset measurements at a construction site to mark curbs, asphalt, lights, fire hydrants, vaults and numerous other fixtures involves obtaining, setting up, and measuring off of a laser assembly, or to use a level and measuring device. The laser method requires the rental or purchase of the laser equipment and the time to properly set up the laser assembly. The level and measuring device method requires two personnel for accuracy. Both methods are expensive and time-consuming. A device is needed that allows accurate, simple, and quick transfer of offset measurements and elevation positioning of fixtures with minimal equipment cost and low personnel requirements.

Specific embodiments of the present invention are now described with reference to the figures, wherein like reference numbers indicate identical or functionally similar elements.

The following detailed description is merely exemplary in nature and is not intended to limit the invention or the application and uses of the invention. Although the description of the invention is in the context of typical offset elevation measurements, the invention may also be used in other ways where it is deemed useful. Furthermore, there is no intention to be bound by any expressed or implied theory presented in the preceding technical field, background, brief summary or the following detailed description.

As referred to herein, a construction site offset adapter assembly used in accordance with and/or as part of various systems, devices, and methods of the present disclosure may include a wide variety of different configurations.

In general terms, the construction site offset adapter assembly of the present disclosure includes a main body and an end cap. The main body is configured to couple a standard level, such as a standard construction level, to a measuring device, such as an engineering ruler, at a right angle. The end cap is configured to couple the level to an offset rod. The main body and end cap when so coupled to the level, provide a configuration wherein a single user may accurately transfer an offset measurement.

Figure 1:
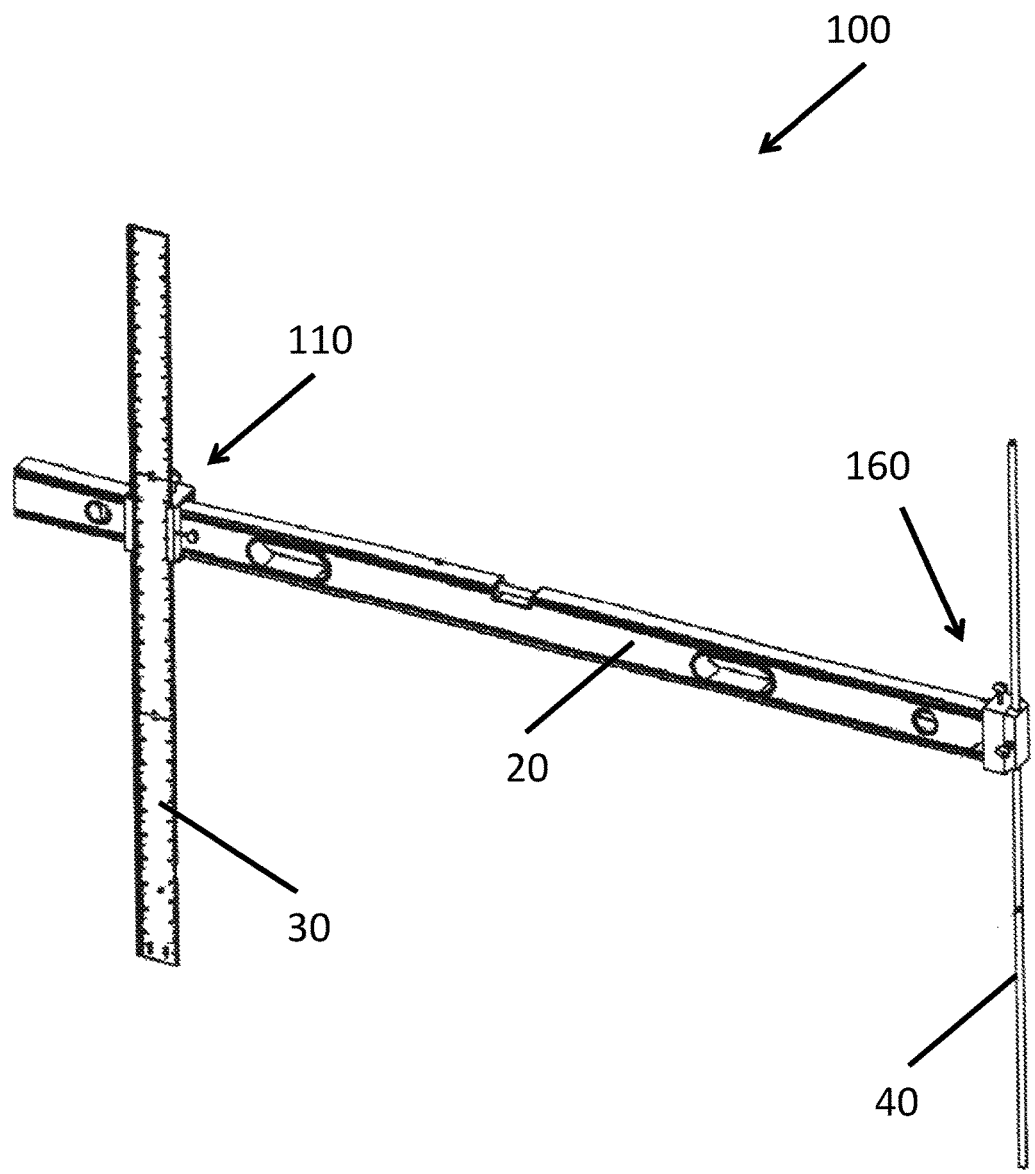
FIG. 1 is a perspective illustration of an embodiment of a construction site offset adapter according to an embodiment hereof, coupled to a level, a measuring device, and an offset rod.

With the above understanding the construction site offset adapter assembly in mind, a construction site offset adapter assembly according to an embodiment of the present invention is shown in FIG. 1 and in greater detail in FIGS. 2-7. Construction site offset adapter assembly 100 includes a main body 110 and an end cap 160, as shown in FIG. 1. Main body 110 and end cap 160 work in conjunction with a level 20, a measuring device 30, and an offset rod 40 to provide proper offset elevation measurements as described in greater detail below. Level 20 may be any standard construction level of necessary length and suitable for the purposes described herein. Measuring device 30 may be any standard engineer scale ruler or yardstick typically used in the construction industry and suitable for the purposes described herein. Offset rod 40 may be any cylindrical rod capable of fitting within a rod passage 192 of end cap 160 as described in greater detail below and shown in FIGS. 5-7.

Figure 2:
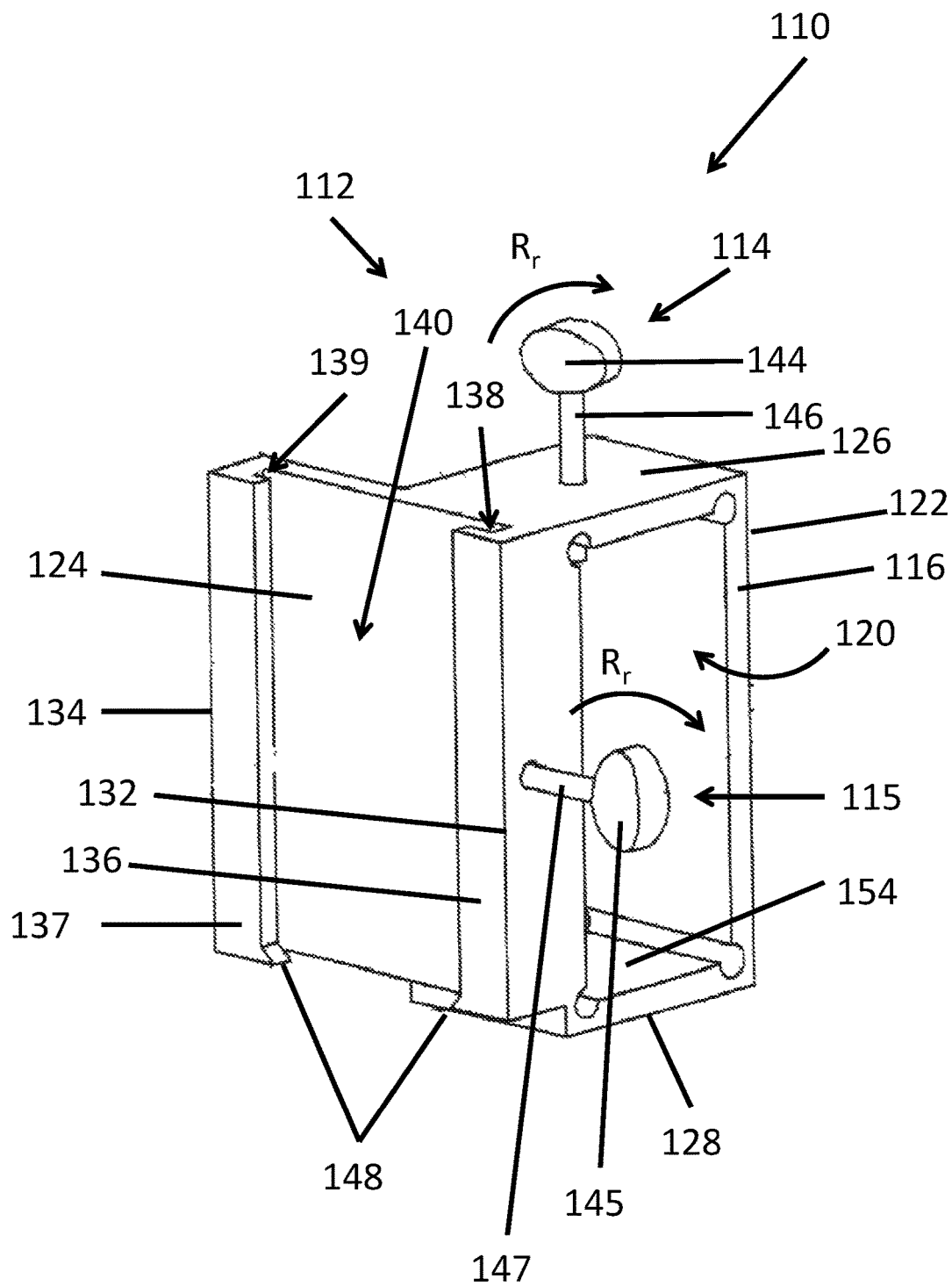
FIG. 2 is a perspective illustration of a main body of the construction site offset adapter assembly of FIG. 1.
Figure 3:
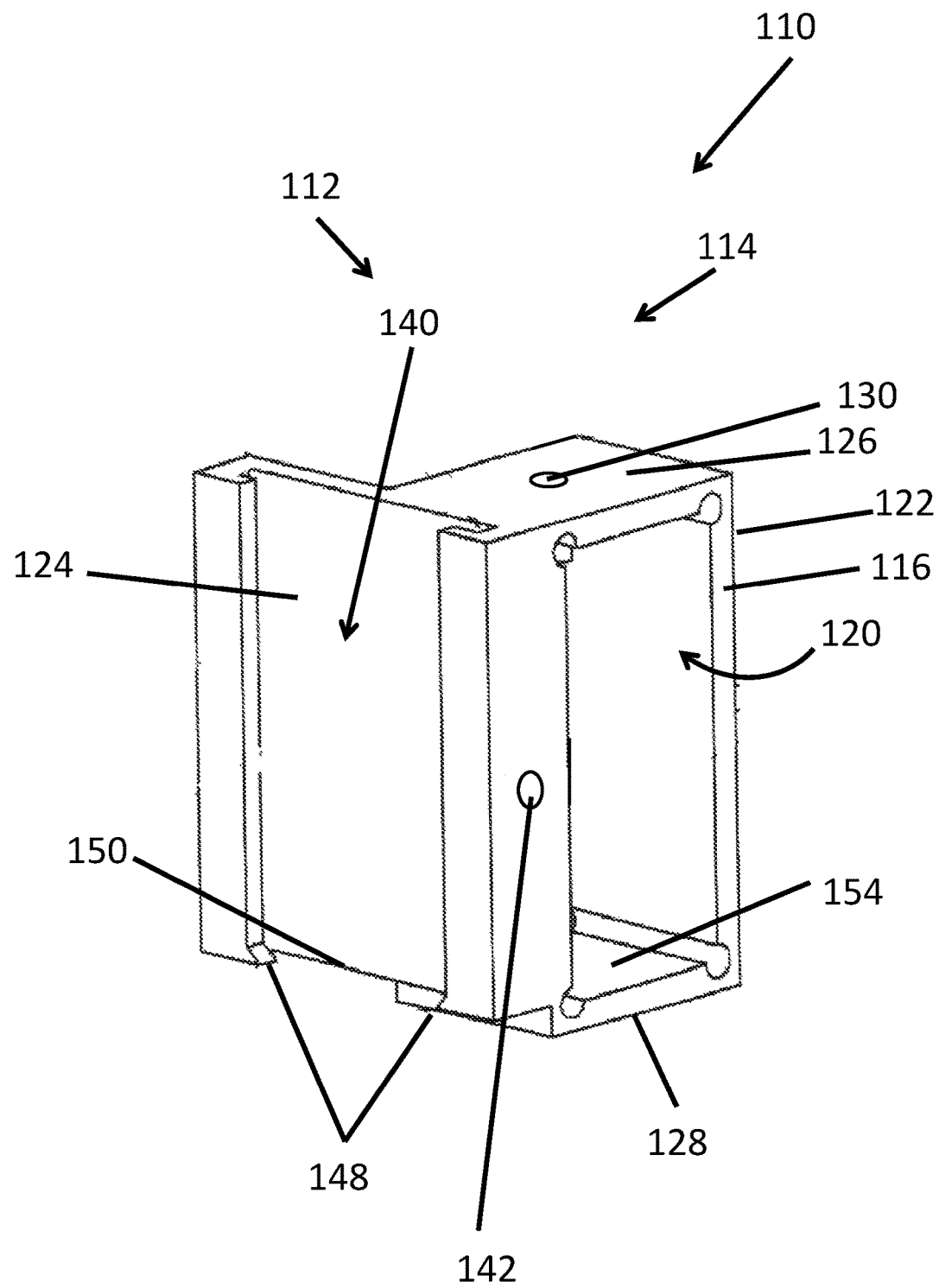
FIG. 3 is another perspective illustration of the main body of FIG. 2, with securing devices removed.
Figure 4:
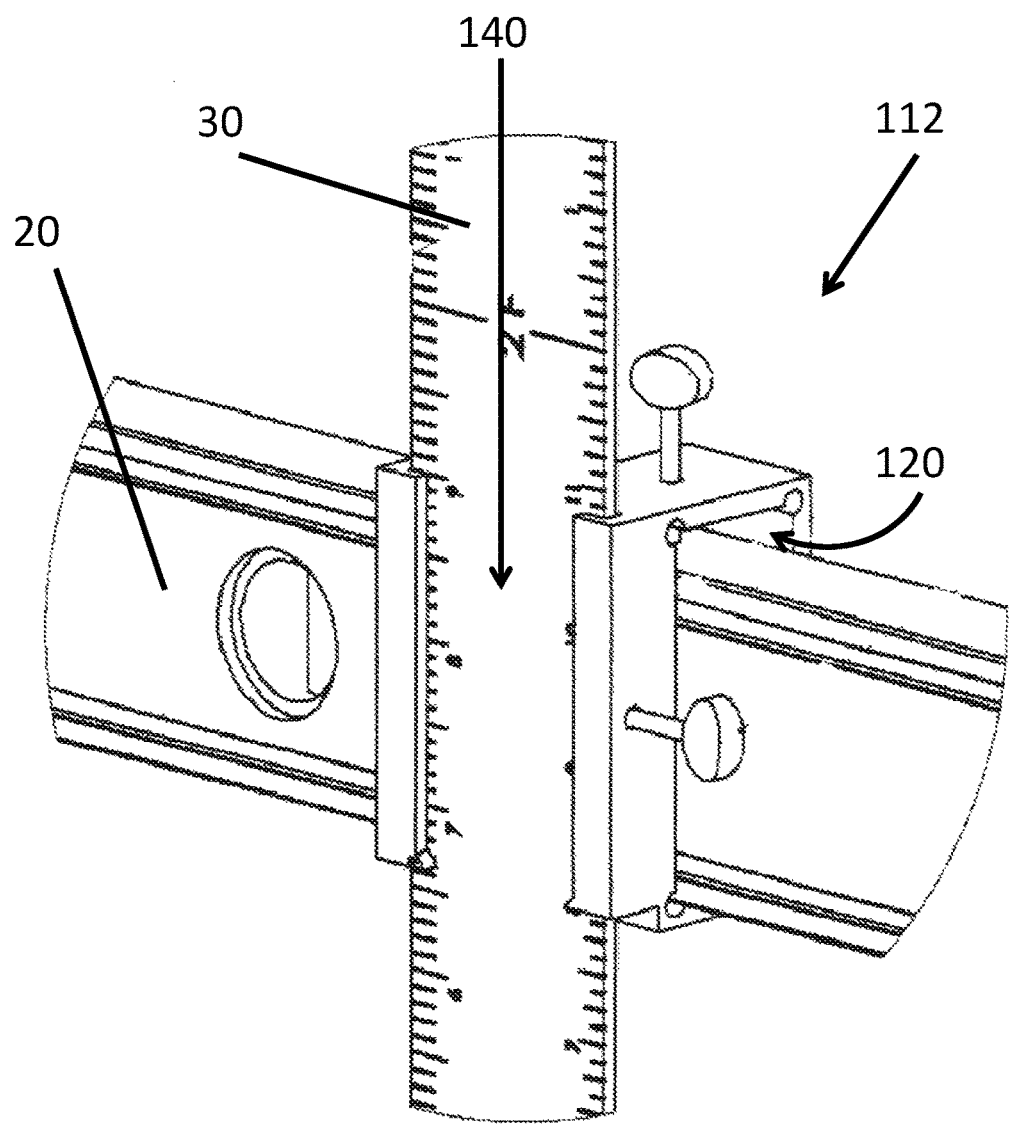
FIG. 4 is a close up perspective illustration of the main body of FIG. 2 coupled to the level and the measuring device.

Main body 110 is of a generally rectangular tube configuration and includes a body 112 and a plurality of securing devices 114/115. Body 112 includes a first end 116 and a second end 118 defining a passage 120, therein, as shown in FIGS. 2-3. Passage 120 is configured such that a level 20 may be accepted therethrough, as shown in FIG. 4. Body 112 further includes a first side 122, a top side 126, a ruler side 124, and a bottom side 128, as shown in FIGS. 2-3.

Top side 126 includes a threaded bore 130 disposed therethrough, between first end 116, second end 118, first side 122, and ruler side 124, as shown in FIG. 3. Threaded bore 130 is configured such that securing device 114 is disposed therein, as shown in FIG. 2. Ruler side 124 extends from a first edge 132 to a second edge 134, wherein first edge 132 is parallel to first end 116 and second edge 134 is parallel to second edge 118. Ruler side 124 further includes a plurality of c-channels 136/137. First c-channel 136 is disposed along first edge 132 and second c-channel 137 is disposed along second edge 134. First and second c-channels 136/137 include an open portion 138/139 respectively, and measurement pointers 148 as described below. First and second c-channels 136/137 are configured such that open portion 138 of c-channel 136 faces second edge 134, and second c-channel 137 is configured such that open portion 139 of second c-channel 137 faces first edge 132 such that c-channels 136 and 137 form a ruler passage 140, as shown in FIGS. 2-3. First and second c-channels 136/137 are further configured such that passage 140 may accept a measuring device 30 disposed therein, as shown in FIG. 4. First end 116 of body 112 includes a threaded bore 142 disposed through first end 116 and extending into first c-channel 136 between passage 120 of body 112 and first edge 132 of ruler side 124, as shown in FIG. 3. Measurement pointers 148 are disposed at a lower portion 150 of ruler side 124. Measurement pointers 148 are configured such that measurement pointers 148 are parallel to bottom side 128 and align horizontally with and are parallel to an inner surface 154 of bottom side 128 and a lower edge of level 20 when level 20 is disposed and secure within passageway 120 of body 112.

Securing devices 114/115 are disposed within threaded bores 130/142, respectively, as shown in FIGS. 2-3. Securing devices 114/115 include a handle 144/145 and a threaded portion 146/147, as shown in FIG. 2. Threaded bore 130 with securing device 114 is configured such that handle 144 of securing device 114 may be rotated in a direction $R_r$, such that threaded portion 146 of securing device 114 moves toward and into passage 120 of main body 110. Threaded bore 130 with securing device 114 is further configured such that handle 144 of securing device 114 may be rotated in a direction $R_l$ opposite direction $R_r$, such that threaded portion 146 of securing device 114 moves away from and out of passage 120 of body 112. Threaded bore 142 with securing device 115 is configured such that handle 145 of securing device 115 may be rotated in direction $R_r$, such that threaded portion 147 of securing device 115 moves toward and into open portion 138 of first c-channel 136. Threaded bore 142 with securing device 115 is further configured such that handle 145 of securing device 115 may be rotated in direction $R_l$ opposite direction $R_r$, such that threaded portion 147 of securing device 115 moves away from and out of open portion 138 of first c-channel 136.

Main body 110 may be formed, for example, and not by way of limitation, of steel, iron, aluminum, plastics, or other materials suitable for the purposes described herein. Main body 110 may be formed, for example, and not by way of limitation, by casting, machining, extruding, or other methods suitable for the purposes described herein.

Figure 5:
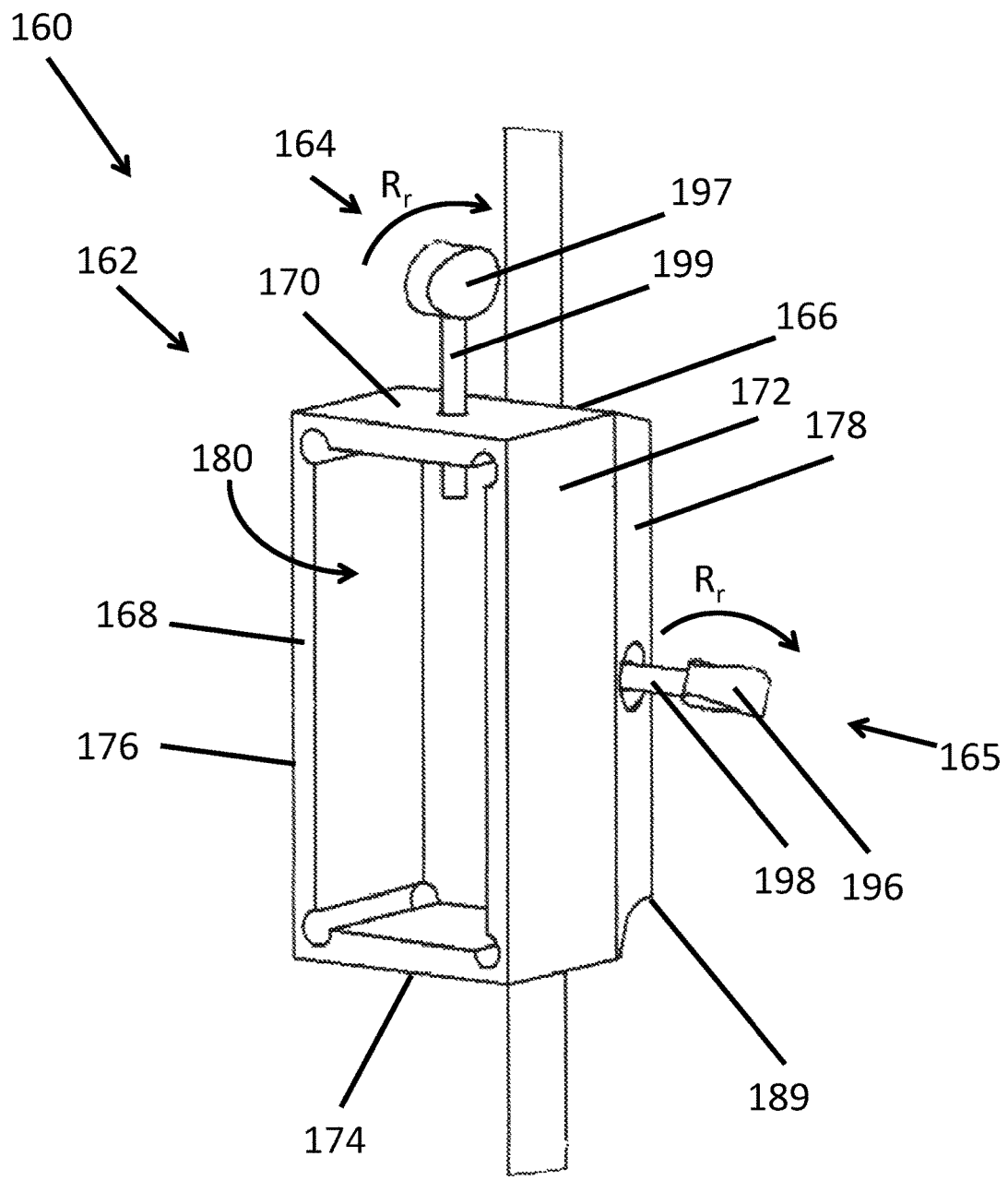
FIG. 5 is a perspective illustration of an end cap of the construction site offset adapter assembly of FIG. 1.
Figure 7:
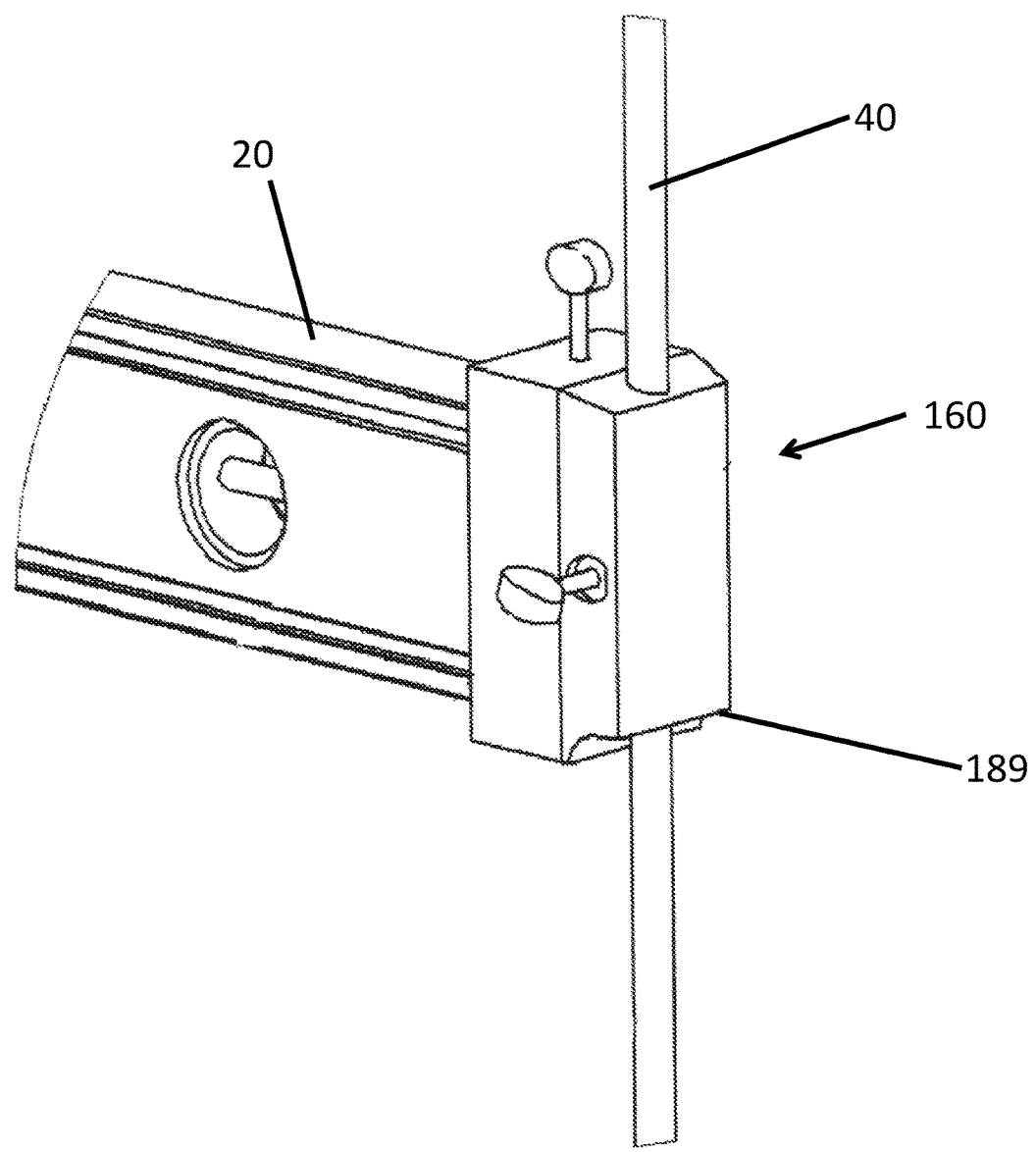
FIG. 7 is a close up perspective illustration of the end cap adapter of FIG. 5 coupled to the level and the offset rod.

End cap 160 is of a generally rectangular configuration and includes a body 162 and a plurality of second securing devices 164/165, as shown in FIG. 5. Body 162 includes a first end 166 and a second end 168. Body 162 includes a top side 170, a first side 172, a bottom side 174, and a second side 176. Body 162 further includes a rod block 178 disposed at first end 166 and configured such that top side 170, first side 172, bottom side 174, second side 176, and rod block 178 form a recess 180 therein. Recess 180 is configured such that level 20 may be accepted therein, as shown in FIG. 7.

Figure 6:
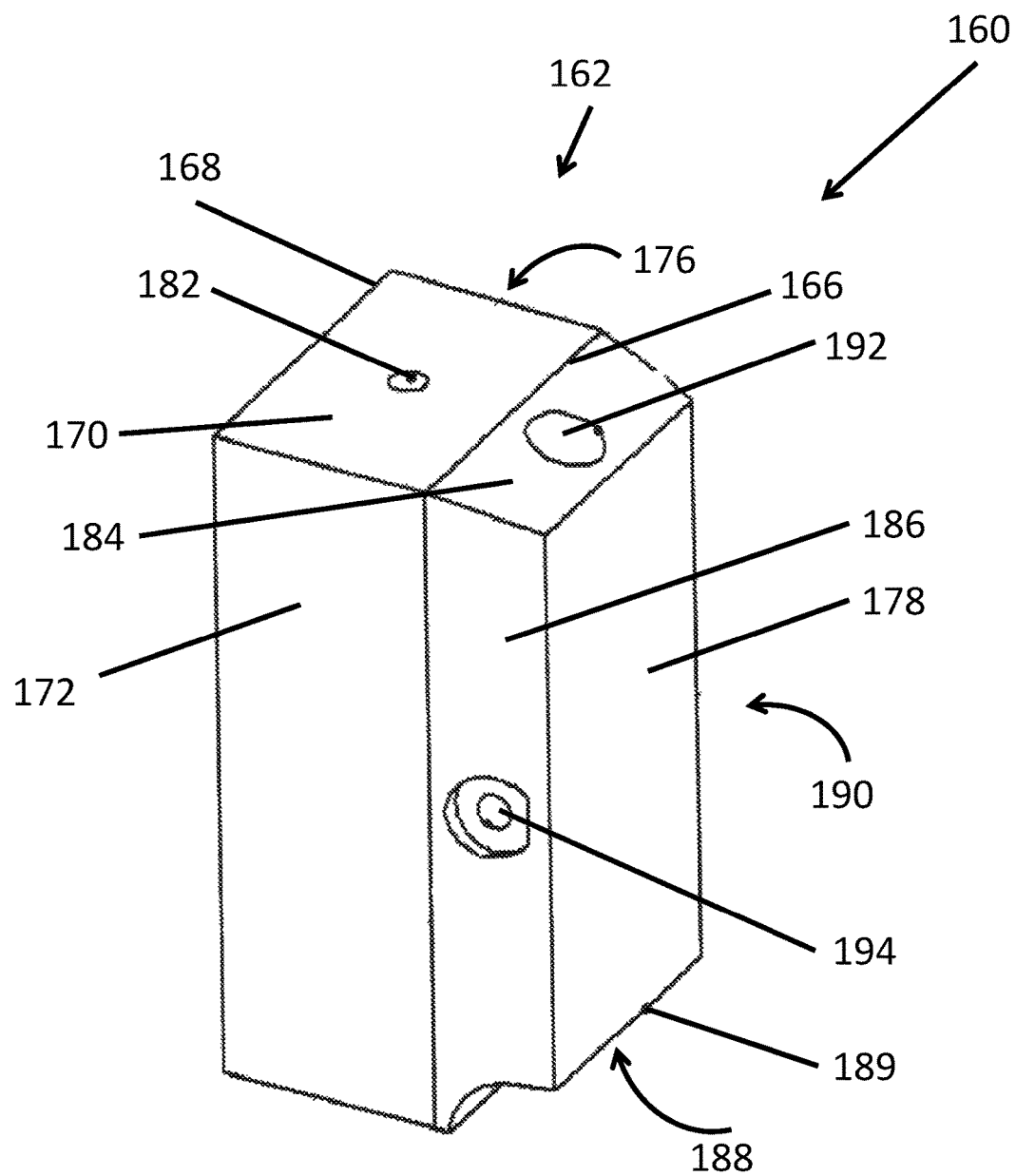
FIG. 6 is a perspective illustration of the end cap adapter of FIG. 5, with second securing devices removed.

Top side 170 includes a threaded bore 182, as shown in FIG. 6. Threaded bore 182 of top side 170 is disposed therethrough, between first end 166, second end 168, first side 172, and second side 176. Threaded bore 182 is configured such that a second securing device 164 may be disposed therein, as shown in FIG. 5.

Rod block 178 is a generally rectangular block disposed at first end 166 as previously described. Rod block 178 includes an top edge 184, a first edge 186, a bottom edge 188, a second edge 190, and a rod passage 192, as shown in FIG. 6. Top edge 184 is generally aligned with top side 170 of body 162. Bottom edge 188 includes a offset measurement point 189. Offset measurement point 189 is configured such that offset measurement point 189 is aligned with and parallel to an inner surface of bottom side 174 within recess 180, as shown in FIG. 5, such that offset measurement point 189 is level with the lower edge of level 20 when level 20 is disposed and secured within recess 180, as shown in FIG. 7. Stated another way, offset measurement point 189 of bottom edge 188 of rod block 178 is level with the lower edge of level 20 when end cap 120 is coupled to level 20. Rod passage 192 of rod block 178 is disposed through rod block 178 between top edge 184 and bottom edge 188. Rod passage 192 is configured such that offset rod 40 may be disposed therein. First edge 186 of rod block 178 is generally aligned with and parallel to first side 172 of body 162. First edge 186 includes a threaded bore 194 disposed therethrough, between first edge 186 and rod passage 192. Second edge 190 of rod block 178 is generally aligned with and parallel to second side 176 of body 162, as shown in FIG. 6.

Second securing devices 164/165 are disposed within threaded bores 182/194, respectively. Second securing devices 164/165 include a handle 196/197 and a threaded portion 198/199, respectively, as shown in FIG. 5. Threaded bore 182 with second securing device 164 is configured such that handle 196 of second securing device 164 may be rotated in direction $R_r$ such that threaded portion 198 of second securing device 164 moves toward and into recess 180 of end cap 120. Threaded bore 182 with second securing device 164 is further configured such that handle 196 of second securing device 164 may be rotated in direction $R_l$ opposite direction $R_r$ such that threaded portion 198 of second securing device 164 moves away from and out of recess 180 of end cap 120. Threaded bore 194 with second securing device 165 is configured such that handle 197 of second securing device 165 may be rotated in direction $R_r$ such that threaded portion 199 of second securing device 165 moves toward and into rod passage 192 of rod block 178. Threaded bore 194 with second securing device 165 is further configured such that handle 197 of second securing device 165 may be rotated in direction $R_l$ opposite direction $R_r$ such that threaded portion 199 of second securing device 165 moves away from and out of rod passage 192 of rod block 178.

End cap 120 may be formed, for example, and not by way of limitation, of steel, iron, aluminum, plastics, or other materials suitable for the purposes described herein. End cap 120 may be formed, for example, and not by way of limitation, by casting, machining, extruding, or other methods suitable for the purposes described herein.

According to embodiments hereof, main body 110 is configured such that level 20 may be disposed within passage 120, as previously described, and as shown in FIGS. 1 and 4. Main body 110 is further configured such that measuring device 30 may be disposed within ruler passage 140, as previously described. Securing device 114 is configured such that rotation of handle 144 of securing device 114 in direction $R_r$ will move threaded portion 146 of securing device $R_r$ toward and into passage 120 such that securing device 114 contacts level 20, disposed therein, such that level 20 is coupled to main body 110 of construction site offset adapter assembly 100. Stated another way, with level 20 disposed within passage 120, rotating handle 144 of securing device 114 in direction $R_r$ will couple main body 110 to level 20. Securing device 115 is configured such that rotation of securing device 115 in direction $R_r$ will move threaded portion 147 of securing device 115 toward and into open channel 138 of first c-channel 136 such that securing device 115 contacts measuring device 30 disposed therein such that measuring device 30 is coupled to main body 110 of construction site offset adapter assembly 100. Stated another way, with measuring device 30 disposed within ruler passage 140 of main body 110, rotating handle 145 of securing device 115 in direction $R_r$ will couple main body 110 to measuring device 30.

According to embodiments hereof, end cap 120 is configured such that level 20 may be disposed within recess 180, as previously described. End cap 120 is further configured such that offset rod 40 may be disposed within rod passage 192 of rod block 178, as previously described. Second securing device 164 is configured such that rotation of handle 196 of second securing device 164 in direction $R_r$ will move threaded portion 198 of second securing device 164 toward and into recess 180 such that second securing device 164 contacts level 20, disposed therein, such that level 20 is coupled to end cap 120 of construction site offset adapter assembly 100. Stated another way, with level 20 is disposed within recess 180, rotating handle 196 of second securing device 164 in direction $R_r$ will couple end cap 120 to level 20. Second securing device 165 is configured such that rotation of second securing device 165 in direction $R_r$ will move threaded portion 199 of second securing device 165 toward and into rod passage 192 of rod block 178 such that second securing device 165 contacts offset rod 40, disposed therein, such that offset rod 40 is coupled to end cap 120 of construction site offset adapter assembly 100. Stated another way, with offset rod 40 disposed within rod passage 192 of rod block 178, rotating handle 196 of second securing device 165 in direction RR will couple end cap 120 to offset rod 40.

While FIGS. 1-4 show level passage 120 of main body 110 as enclosed (with four sides), this is not meant to limit the design and other configurations are envisioned, such as but not limited to a channel or any other shape suitable for the purposes described herein.

While FIGS. 1-4 show securing devices 114/115 as having handles 144/145 and threaded portions 146/147, this is not meant to limit the design and other configurations are envisioned, such as but not limited to camlocks, bolts, and other securing devices suitable for the purposes described herein.

While FIGS. 1 and 5-7 show recess 180 of end cap 120 as enclosed (with four sides), this is not meant to limit its design and other configurations are envisioned, such as but not limited to a channel or any other shape suitable for the purposes described herein.

While FIGS. 1 and 5-7 show rod passage 192 of rod block 178 of end cap 120 as enclosed, this is not meant to limit its design and other configurations are envisioned suitable for the purposes described herein.

While FIGS. 5-7 show securing devices 164/165 as having handles 196/197 and threaded portions 198/199, this is not meant to limit the design and other configurations are envisioned, such as but not limited to camlocks, bolts, and other securing devices suitable for the purposes described herein.

Figure 8:
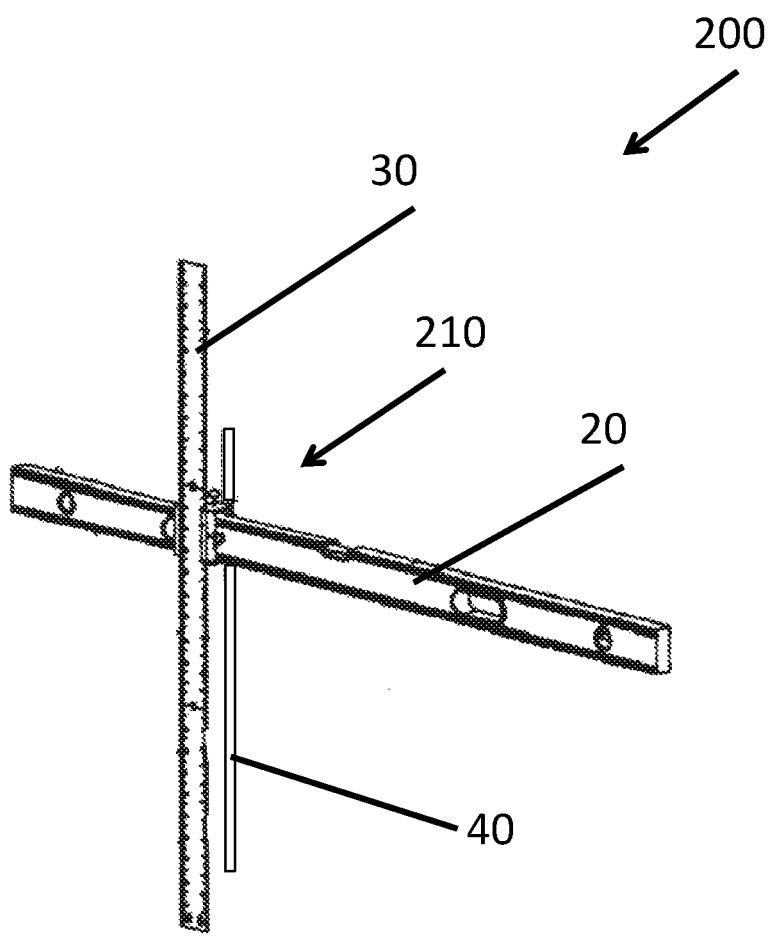
FIG. 8 is a perspective illustration of an embodiment of a construction site offset adapter according to another embodiment hereof.
Figure 9:
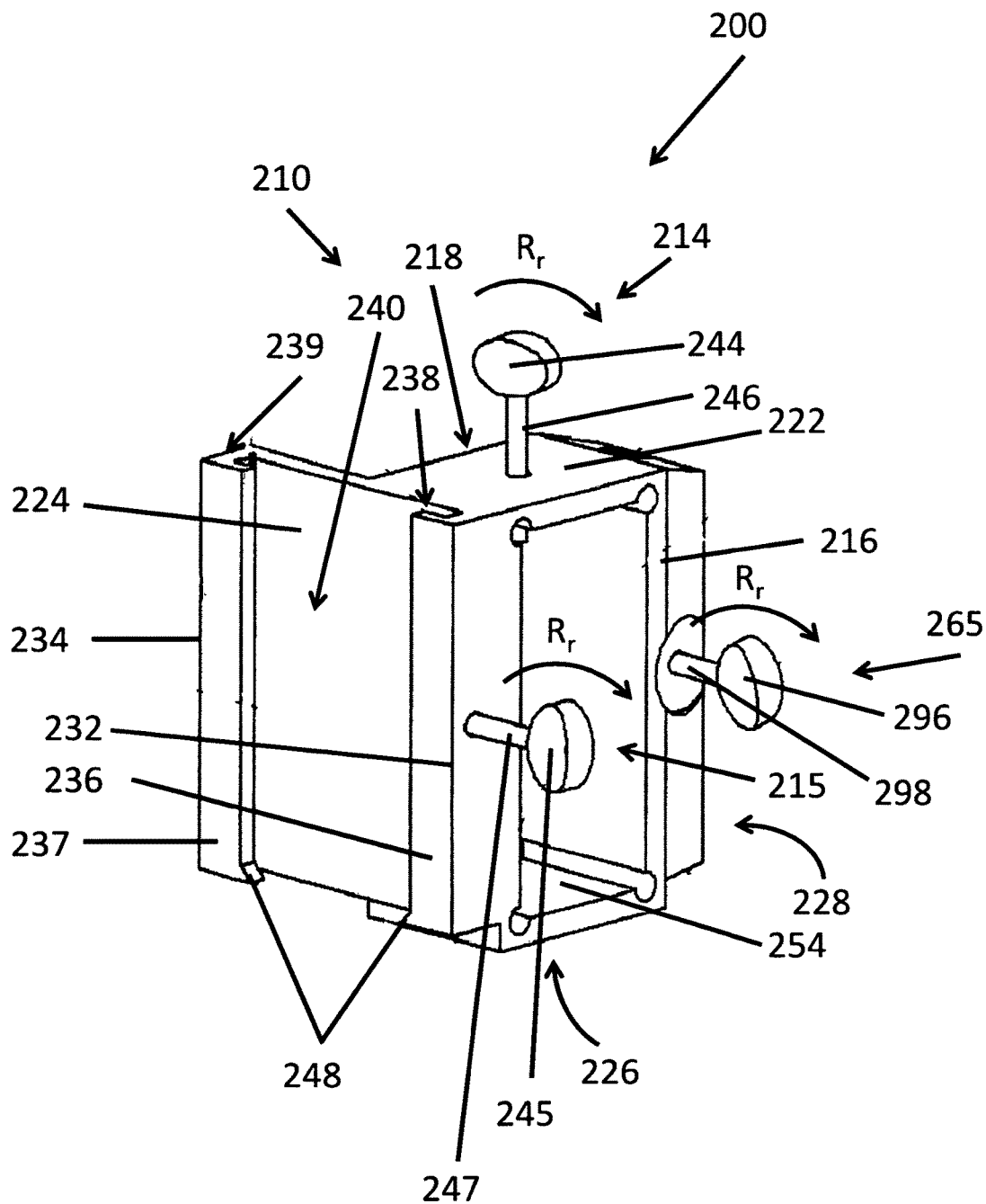
FIG. 9 is a perspective illustration of a body of the construction site offset adapter assembly of FIG. 8, with securing devices removed.
Figure 10:
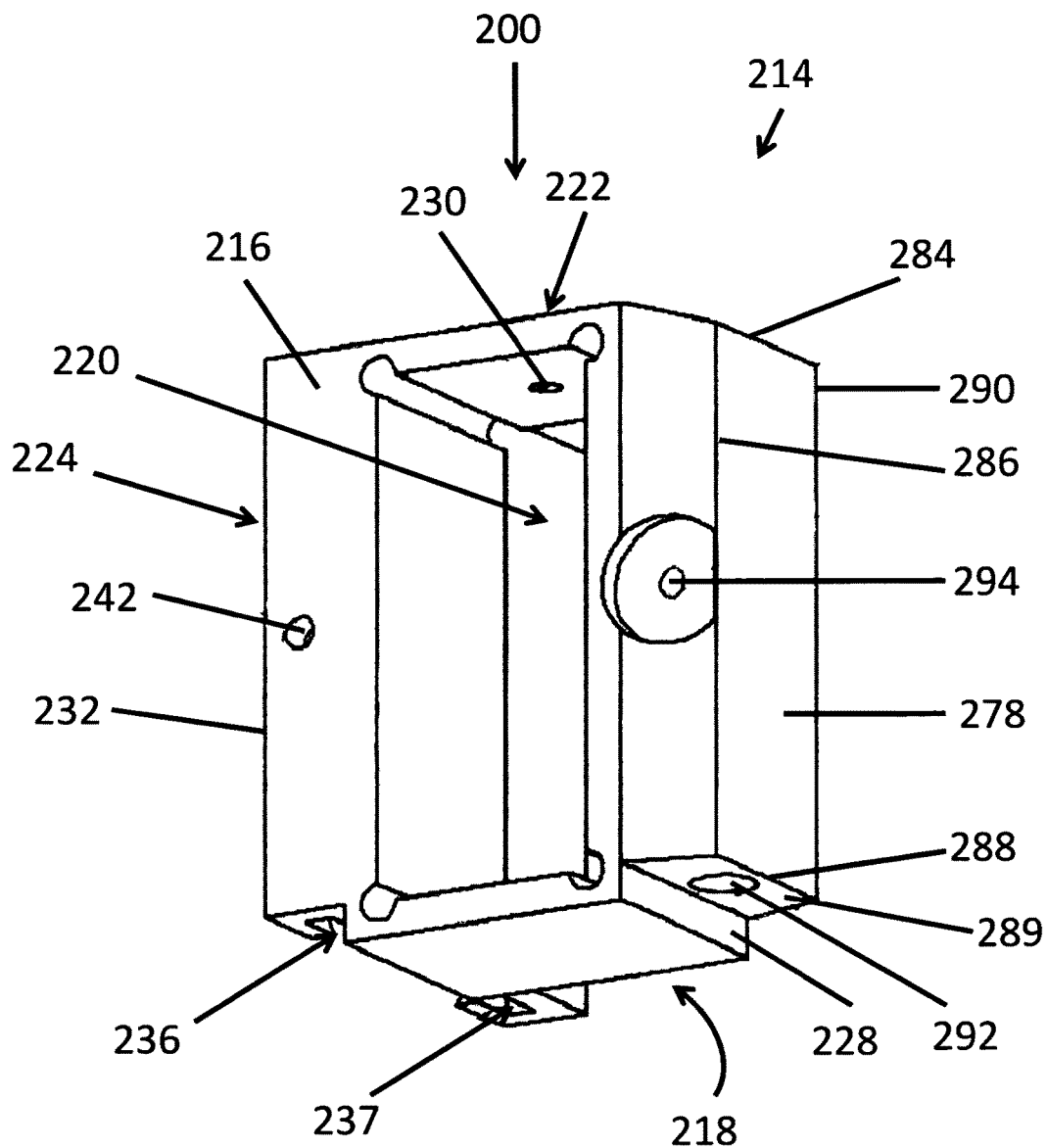
FIG. 10 is a close up perspective illustration of the construction site offset adapter assembly of FIG. 8 coupled to a level, a measuring device, and an offset rod.

A construction site offset adapter assembly according to another embodiment of the present invention is shown in FIG. 8 and in greater detail in FIGS. 9-10. Construction site offset adapter assembly 200 includes a body 210. Body 210 works in conjunction with a level 20, a measuring device 30, and an offset rod 40 to provide proper offset elevation measurements as described in greater detail below. Level 20 may be any standard construction level of necessary length. Measuring device 30 may be any standard engineer scale yardstick typically used in the construction industry or other rulers. Offset rod 40 may be any cylindrical rod capable of fitting within a rod passage 292 of body 210 as described in greater detail below.

Body 210 is of a generally rectangular tube configuration and includes a plurality of securing devices 214/215/265, as shown in FIG. 9. Body 210 includes a first end 216 and a second end 218 defining a passage 220, therein. Passage 220 is configured such that a standard level 20 may be accepted therethrough. Body 210 further includes a top side 222, a ruler side 224, a bottom side 226, and a rod side 228.

Top side 222 includes a threaded bore 230 disposed therethrough, between first end 216, second end 218, ruler side 224 and rod side 228, as shown in FIG. 10. Threaded bore 230 is configured such that securing device 214 is disposed therein, as shown in FIG. 9. Ruler side 224 extends from a first edge 232 to a second edge 234, wherein first edge 232 is parallel to first end 216 and second edge 234 is parallel to second edge 234. Ruler side 224 further includes a plurality of c-channels 236/237. First c-channel 236 is disposed along first edge 232 and second c-channel 237 is disposed along second edge 234. First and second c-channels 236/237 include an open portion 238/239 respectively, and measurement pointers 248 as described below. First and second c-channels 236/237 are configured such that open portion 238 of c-channel 236 faces second edge 234, and second c-channel 237 is configured such that open portion 239 of second c-channel 237 faces first edge 232 such that c-channels 236 and 237 form a ruler passage 240, as shown in FIG. 9. First and second c-channels 236/237 are further configured such that ruler passage 240 may accept a measuring device 30 disposed therein. First end 216 of body 210 includes a threaded bore 242 disposed through first end 216 and extending into first c-channel 236 between passage 220 of body 210 and first edge 232 of ruler side 224. Measurement pointers 248 are disposed at a lower portion 250 of ruler side 224. Measurement pointers 248 are configured such that measurement pointers 248 are parallel to bottom side 226 and align with and are parallel to an inner surface 254 of bottom side 226 and a lower edge of level 20 when level 20 is disposed and secured within passageway 220, as shown in FIG. 9.

Rod side 228 is a generally rectangular block disposed as previously described. Rod side 228 includes a rod block 278, as shown in FIG. 10. Rod block 278 includes a top edge 284, a first edge 286, a bottom edge 288, a second edge 290, and a rod passage 292. Top edge 284 is generally aligned with top side 222 of body 210. Bottom edge 288 includes an offset measurement point 289. Offset measurement point 289 is configured such that offset measurement point 289 is aligned with and parallel to an inner surface of bottom side 226 within passage 220 such that offset measurement point 289 is level with the lower edge of level 20 when level 20 is disposed within passage 220. Stated another way, offset measurement point 289 of bottom edge 288 of rod block 278 is level with the lower edge of level 20 when body 210 is coupled to level 20. Rod passage 292 of rod block 278 is disposed through rod block 278 between top edge 284 and bottom edge 288. Rod passage 292 is configured such that offset rod 40 may be disposed therein. First edge 286 of rod block 278 is generally aligned with and parallel to first edge 216 of body 210. First edge 286 includes a threaded bore 294 disposed therethrough, between first edge 286 of rod edge 278 and rod passage 292. Second edge 290 of rod block 278 is generally aligned with and parallel to second edge 234 of body 210.

Securing devices 214/215/265 are disposed within threaded bores 230/242/294, respectively. Securing devices 214/215/265 include a handle 244/245/296 and a threaded portion 246/247/298, as shown in FIG. 9. Threaded bore 230 with securing device 214 is configured such that handle 244 of securing device 214 may be rotated in a direction $R_r$ such that threaded portion 246 of securing device 214 moves toward and into passage 220 of body 210. Threaded bore 230 with securing device 214 is further configured such that handle 244 of securing device 214 may be rotated in a direction $R_l$ opposite direction $R_r$ such that threaded portion 246 of securing device 214 moves away from and out of passage 220 of body 210. Threaded bore 242 with securing device 215 is configured such that handle 245 of securing device 215 may be rotated in direction $R_r$ such that threaded portion 247 of securing device 215 moves toward and into open channel 238 of first c-channel 236. Threaded bore 242 with securing device 215 is further configured such that handle 245 of securing device 215 may be rotated in direction $R_l$ opposite direction $R_r$ such that threaded portion 247 of securing device 215 moves away from and out of open channel 238 of first c-channel 236. Threaded bore 294 with securing device 265 is configured such that handle 296 of securing device 265 may be rotated in direction $R_r$ such that threaded portion 298 of securing device 265 moves toward and into rod passage 292 of rod block 278. Threaded bore 294 with securing device 265 is further configured such that handle 296 of securing device 265 may be rotated in direction $R_l$ opposite direction $R_r$ such that threaded portion 298 of securing device 265 moves away from and out of rod passage 292 of rod block 278.

Body 210 may be formed, for example, and not by way of limitation, of steel, iron, aluminum, plastics, or other materials suitable for the purposes described herein. Body 210 may be formed, for example, and not by way of limitation, by casting, machining, extruding, or other methods suitable for the purposes described herein.

According to embodiments hereof, body 210 is configured such that level 20 may be disposed within passage 220, as previously described. Body 210 is further configured such that measuring device 30 may be disposed within ruler passage, as previously described. Body 210 is further configured such that offset rod 40 may be disposed within rod passage 192, as previously described. Securing device 214 is configured such that rotation of handle 244 of securing device 214 in direction $R_r$ will move threaded portion 246 of securing device 214 toward and into passage 220 such that securing device 214 contacts level 20, disposed therein, such that level 20 is coupled to body 210 of construction site offset adapter assembly 200. Stated another way, with level 20 disposed within passage 220, rotating handle 244 of securing device 214 in direction $R_r$ will couple body 210 to level 20. Securing device 215 is configured such that rotation of securing device 215 in direction $R_r$ will move threaded portion 247 of securing device 215 toward and into open channel 238 of first c-channel 236 such that second securing device 215 contacts measuring device 30 disposed therein such that measuring device 30 is coupled to body 210 of construction site offset adapter assembly 200. Stated another way, with measuring device 30 disposed within ruler passage 240 of body 210, rotating handle 245 of securing device 215 in direction $R_r$ will couple body 210 to measuring device 30. Securing device 265 is configured such that rotation of securing device 265 in direction $R_r$ will move threaded portion 298 of securing device 214 toward and into rod passage 292 of rod block 278 of body 210 such that securing device 265 contacts offset rod 40 disposed therein such that offset rod 40 is coupled to body 210 of construction site offset adapter assembly 100. Stated another way, with offset rod 40 disposed within rod passage 292 of rod block 278, rotating handle 296 of securing device 265 in direction $R_r$ will couple body 210 to offset rod 40.

While FIGS. 8-10 show level passage 220 of body 210 as enclosed (with four sides), this is not meant to limit its design and other configurations are envisioned, such as but not limited to a channel or any other shape suitable for the purposes described herein.

While FIGS. 8-10 show securing devices 214/215/265 as having handles 244/245/296 and threaded portions 246/247/

298, this is not meant to limit the design and other configurations are envisioned, such as but not limited to camlocks, bolts, and other securing devices suitable for the purposes described herein.

While FIGS. 8-10 show rod passage 292 of rod block 278 of body 210 as enclosed, this is not meant to limit its design and other configurations are envisioned suitable for the purposes described herein.

Figure 11:
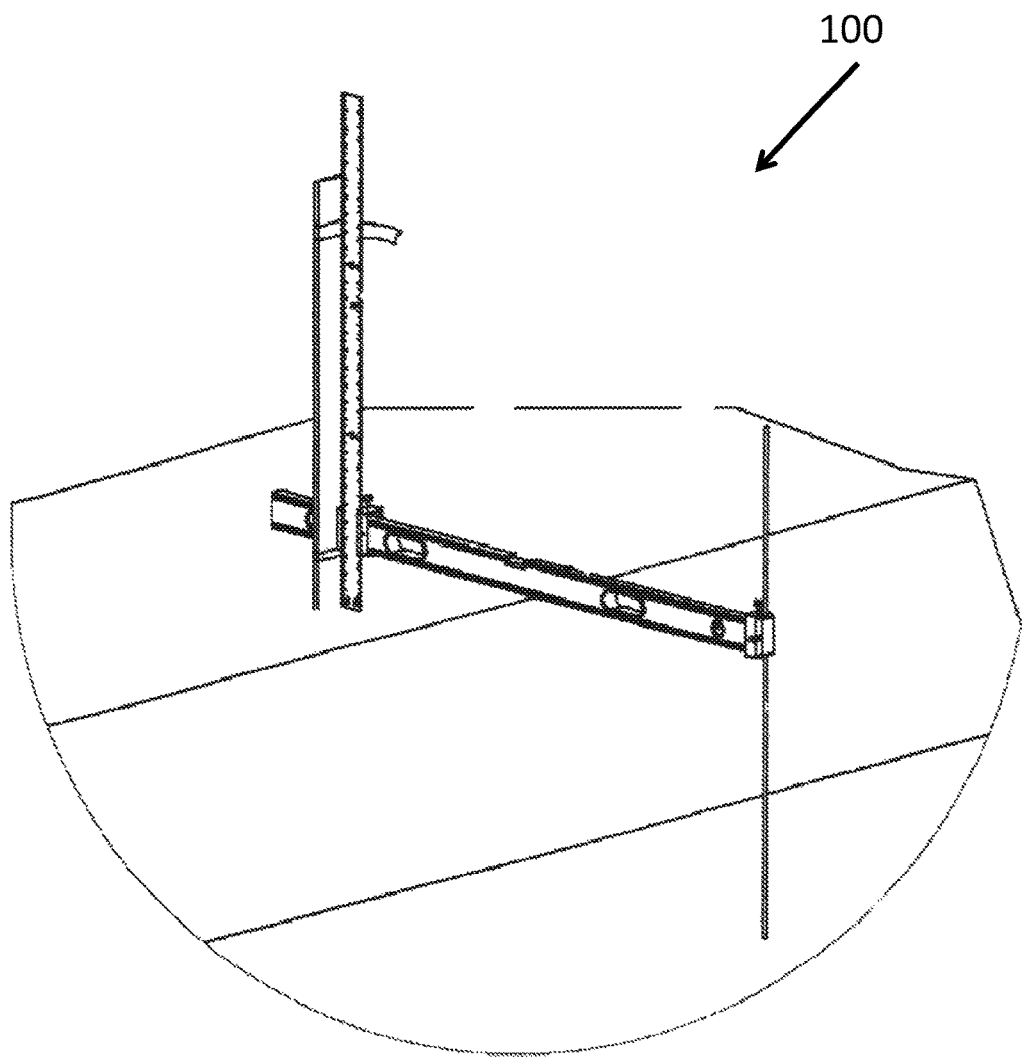
FIG. 11 is an illustration of a typical "cut" application for the construction site offset adapter assembly.
Figure 12:
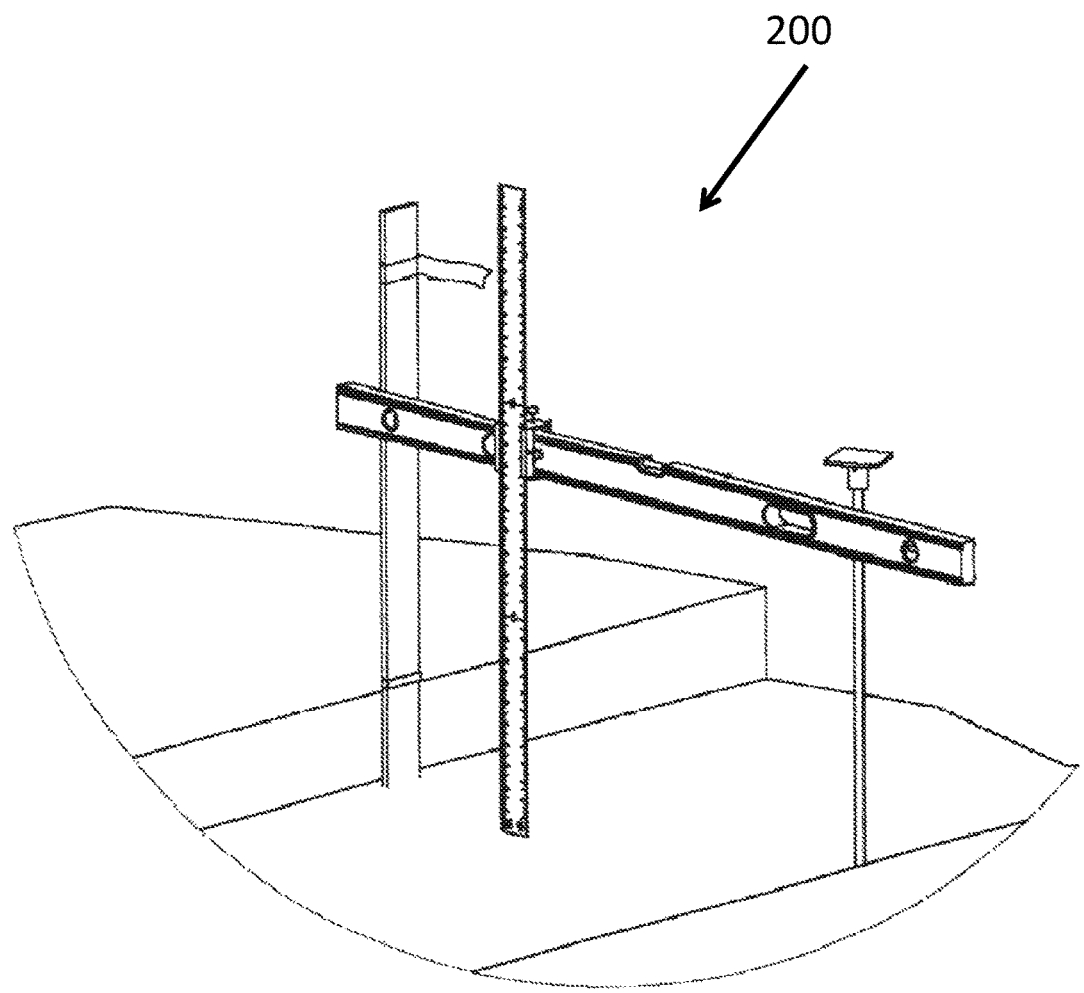
FIG. 12 is an illustration of a typical "fill" application for the construction site offset adapter assembly.

Typical applications for setting up for a "fill" or a "cut" offset measurement, as is known in the art, at a construction site are presented in FIGS. 11-12. A typical "cut" application with construction offset adapter assembly 100 is shown in FIG. 11. A typical "fill" application with construction offset adapter assembly 200 is shown in FIG. 12. While these applications are general, they are not meant to limit the invention and additional applications for the construction site offset adapter assembly for placement of materials and utility fixtures are envisioned, such as, but not limited to placement of a utility vaults, storm drains, catch basins, and other applications suitable for the purposes described herein.

What is claimed:

1. An offset adapter assembly comprising:
   a main body including a securing device and a measurement pointer, wherein the securing device couples the main body to a level and to a measuring device, and wherein the measurement pointer is aligned with the lower edge of the level when the level is coupled therein; and
   an end cap including a second securing device and an offset measurement point, wherein the second securing device couples the end cap to the level and to an offset rod, and wherein the offset measurement point is aligned with a lower edge of the level when the level is coupled therein.

2. The offset adapter assembly of claim 1, wherein the securing device of the main body includes a plurality of securing devices.

3. The offset adapter assembly of claim 1, wherein the second securing device of the end cap includes a plurality of second securing devices.

4. The offset adapter assembly of claim 1, wherein the measurement pointer includes a plurality of measurement pointers.

5. An offset adapter assembly comprising:
   a body including a securing device, a measurement pointer, and a offset measurement point, wherein the securing device couples the body to a level, a measuring device, and an offset rod, wherein the measurement pointer is aligned with a lower edge of the level when the level is coupled therein, and wherein the offset measurement point is aligned with the lower edge of the level when the level is coupled therein.

6. The offset adapter assembly of claim 5, wherein the securing device of the main body includes a plurality of securing devices.

7. The offset adapter assembly of claim 5, wherein the measurement pointer includes a plurality of measurement pointers.

* * * * *